US008082661B2

(12) United States Patent
Schuster

(10) Patent No.: US 8,082,661 B2
(45) Date of Patent: Dec. 27, 2011

(54) DEVICE FOR FIXING A FLAT OBJECT, IN PARTICULAR A SUBSTRATE, TO A WORK SURFACE BY MEANS OF LOW PRESSURE

(75) Inventor: Johannes Schuster, Constance (DE)

(73) Assignee: Kulicke & Soffa Die Bonding GmbH, Berg (CH)

( * ) Notice: Subject to any disclaimer, the term of this patent is extended or adjusted under 35 U.S.C. 154(b) by 780 days.

(21) Appl. No.: 11/793,266

(22) PCT Filed: Dec. 20, 2005

(86) PCT No.: PCT/EP2005/056982

§ 371 (c)(1), (2), (4) Date: Mar. 10, 2008

(87) PCT Pub. No.: WO2006/069942

PCT Pub. Date: Jul. 6, 2006

(65) Prior Publication Data

US 2008/0224372 A1 Sep. 18, 2008

(30) Foreign Application Priority Data

Dec. 27, 2004 (CH) .................................... 2155/04

(51) Int. Cl.
*B23P 19/00* (2006.01)

(52) U.S. Cl. ............................... 29/760; 29/721; 29/743

(58) Field of Classification Search .................... 29/760, 29/743, 721
See application file for complete search history.

(56) References Cited

U.S. PATENT DOCUMENTS

| | | | | |
|---|---|---|---|---|
| 5,324,012 | A | 6/1994 | Aoyama et al. | |
| 5,575,549 | A | 11/1996 | Ishikawa et al. | |
| 6,032,997 | A | 3/2000 | Elliott et al. | |
| 6,182,957 | B1 | 2/2001 | Becker | |
| 6,203,082 | B1 | 3/2001 | Bendat et al. | |
| 6,811,884 | B2 * | 11/2004 | Goodwin et al. | 428/447 |
| 6,853,533 | B2 * | 2/2005 | Parkhe | 361/234 |
| 2006/0267294 | A1 | 11/2006 | Busse et al. | |

FOREIGN PATENT DOCUMENTS

DE 252 707 12/1987

* cited by examiner

*Primary Examiner* — Thiem Phan
(74) *Attorney, Agent, or Firm* — Christopher M. Spletzer, Sr.

(57) ABSTRACT

An apparatus (1) for fixing a planar object, in particular a substrate (2), on a working area (4) by means of vacuum is provided with an at least partly transparent bearing plate (5), one side of which forms the working area and which has a rear side arranged at a distance from the working area with a radiation-reflecting structure (7). The bearing plate additionally has vacuum channels which can be connected to a vacuum line and which open into the working area. In order to illuminate the substrate as homogeneously as possible by means of transmitted light, at least one light source (10) is provided, the radiation of which can be fed into the bearing plate. In addition, the working area is preferably operatively connected to a heating apparatus (11), so that the substrate (2) can be heated.

23 Claims, 2 Drawing Sheets

Figure 1:
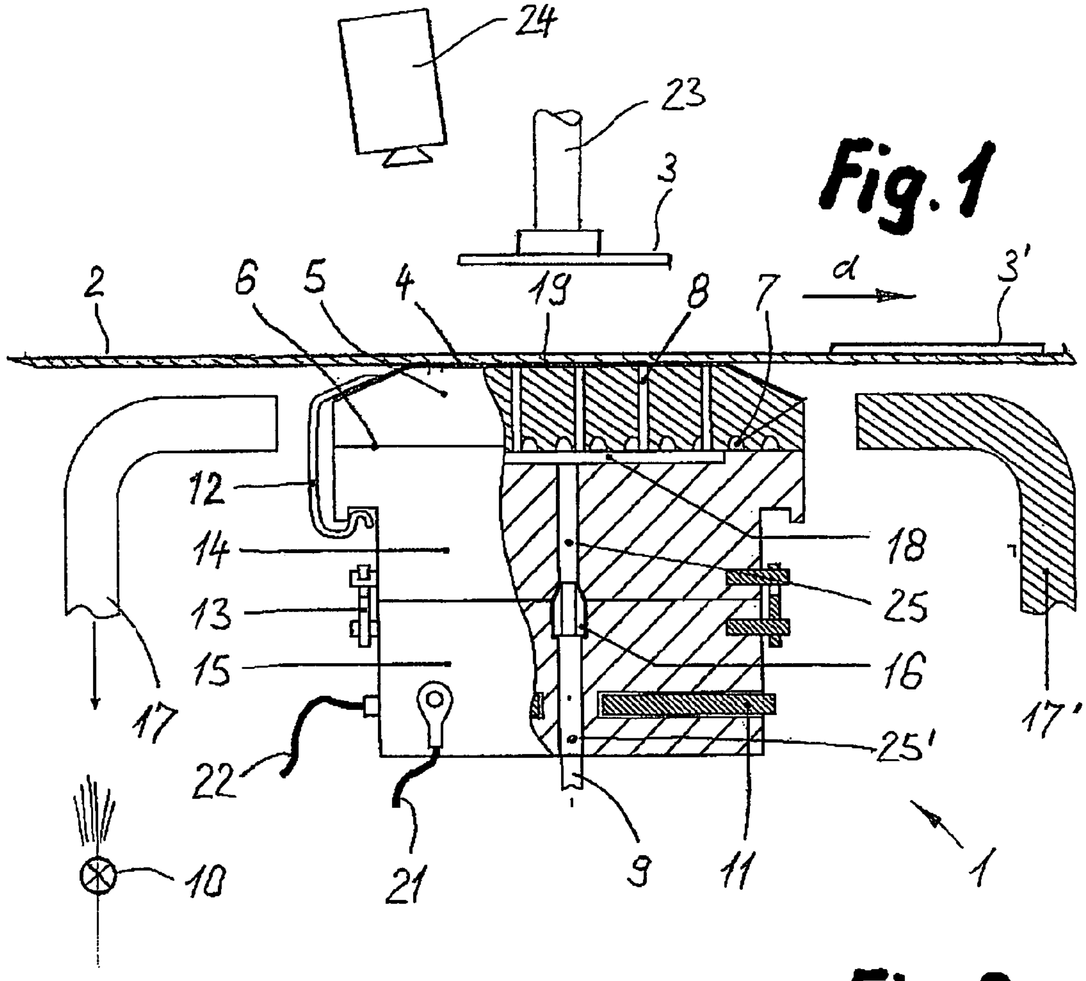

DEVICE FOR FIXING A FLAT OBJECT, IN PARTICULAR A SUBSTRATE, TO A WORK SURFACE BY MEANS OF LOW PRESSURE

The invention relates to an apparatus for fixing a planar object, in particular a substrate, on a working area by means of vacuum in accordance with the preamble of claim 1.

Apparatuses of this type, also called frame support ("vacuum chuck"), serve principally in the semiconductor industry to precisely fix a substrate for a specific processing process and to position it relative to a working tool. Thus, by way of example, in the fabrication of semiconductor components with the aid of so-called die bonders, the already completely processed silicon chips have to be taken from a wafer and placed precisely onto a leadframe or strip and be permanently connected to this substrate. In order to comply with a high positioning accuracy and for other purposes, an image processing system is provided, which can be used to determine the target placement position of the chip on the basis of markings on the substrate. However, the image processing system may additionally also serve for the inspection of the working region before and after the placement of the chip.

The markings for the target placement position may be situated on the side to be populated or alternatively on the rear side of the substrate. In the first case, the problem of image recognition can be solved very simply because it is possible to effect a fixing of the substrate by means of a "vacuum chuck" from one side, and reflected light illumination and the image recognition and also the populating can be effected from the other side. In the case where the markings are positioned on the rear side (that is to say when positioned remote from the image processing system), on the one hand it is necessary to choose a light wavelength at which the substrates have a specific minimum transparency. On the other hand, when using reflected light illumination in combination with the "vacuum chucks" that are typically used nowadays, a reduced image quality and hence positioning accuracy have to be reckoned with owing to passage through the substrate twice and rearside reflection at the markings.

U.S. Pat. No. 6,032,997 has disclosed a "vacuum chuck" in which the bearing plate comprises a mouldable glass body, the surface of which has a plane supporting structure comprising a plurality of sections. A reflecting layer is arranged on the rear side of the bearing plate, so that an optical positioning system arranged above the apparatus can recognize positioning marks on the rear side of a wafer lying on the bearing plate. However, such an apparatus is not suitable for processing substrates which completely cover the working area, as is typical e.g. in die bonding.

Therefore, it is an object of the invention to avoid the disadvantages mentioned above and to provide an apparatus of the type mentioned in the introduction in which a better image quality is achieved for the required image processing systems even in the case where the position marks are positioned on the rear side.

This object is achieved according to the invention by means of an apparatus having the features in claim 1. The arrangement of a light source whose beam path can be fed into the bearing plate has the effect that the substrate is illuminated homogeneously by transmitted light, with the result that rear-side position marks can be recognized better by the image processing system. Transmitted light illumination always affords a better signal-to-noise ratio for position marks which are inherently non-transparent. The planar homogeneous illumination from below also makes it possible, however, to keep the region above the working area completely free of light sources, whereby more space is available. This makes it possible, for example, for a camera and a to be arranged on the same side of the substrate without any problems. The vacuum channels provide for stable fixing of the object lying on the working area, which is particularly important in the case of a semiconductor substrate.

The apparatus according to the invention is suitable in a particularly advantageous manner for use in a die bonder. However, other possible uses are also readily conceivable, such as e.g. in the textile industry, in the paper industry or in other sectors in which a planar object has to be processed using an image processing system. Additional application possibilities arise in the semiconductor industry, e.g. in the construction of components in which the substrate comprises a thin plastic film, or in the case of components in which two or more chips are stacked one above the other, in which case, with the aid of the apparatus according to the invention, it is possible to effect illumination through the first chip and/or the substrate in order to align the second chip with the first chip. Finally, however, it is also conceivable to use the homogeneous illumination of the working area to illuminate a pick tool in order thus to determine the position of a chip at the tool.

A heating apparatus operatively connected to the working area additionally enables the working area to be heated. The substrate is thus simultaneously exposed to light and to heat on its underside.

The bearing plate is preferably composed of glass ceramic. In this case, however, quartz glass or else, under specific preconditions, some other vitreous material may also be involved.

The reflecting structure on the rear side of the bearing plate serves for deflecting the light in the direction of the substrate. The structures cause light to be coupled out from the plate in the vertical direction in a controlled manner and in a manner that can be set by the form and density of said structures. The structure may be realized for example by depressions directed towards the working area. A pyramidal, conical, bowl-like or strip-like structure may be involved in this case. In this case, the depressions need not necessarily be distributed homogeneously over the area. Depending on the configuration of the bearing plate or depending on the type and number of the light sources used, it is possible to use an inhomogeneous distribution of the depressions or else a different configuration of the depressions in order to obtain a distribution of the light on the working area that is as homogeneous as possible.

In a particularly advantageous manner, the bearing plate bears on a plate base. In this case, the bearing plate may be releasably connected to the plate base or it may also be adhesively bonded thereto. The releasable fixing has the advantage that the bearing plate can also be cleaned on all sides and that the bearing plate can be exchanged cost-effectively in the event of damage. Furthermore, easier adaptation to another product to be processed is also possible. Finally, the plate base, for its part, may bear releasably on a pedestal, it being possible for a heating apparatus to be arranged in the pedestal. In this case, heat is transferred from the pedestal to the plate base and from there into the bearing plate. The releasable arrangement of the plate base has the advantage that conventional frame supports can also be placed onto the heatable pedestal and, without illumination, merely have to be heated and/or connected to a vacuum supply.

The radiation-reflecting structure need not necessarily or not exclusively be arranged on the rear side of the bearing plate. If the bearing plate bears on a plate base, it is also conceivable for the surface of the plate base to have a corresponding structure for example in the form of depressions. In this case, however, the depressions have to be filled with a suitable material for refractive index adaptation. A combination of structures on the plate base and on the rear side of the bearing plate would also be conceivable.

In specific cases, it is conceivable for the bearing plates to be provided with a heatable coating. Such an electrically heatable coating can be made so thin that the radiation through the substrate is not impaired or is only impaired to an insignificant extent. The advantage of the heatable coating resides, however, in the fact that the supply of heat can be controlled better and more rapidly.

The light source may be arranged laterally with respect to the bearing plate for instance at the level between the working area and the radiation-reflecting layer. This arrangement ensures an optimum effect of the radiation-reflecting structure on the rear side of the bearing plate. In specific cases, however, it may also be advantageous if the radiation from the light source can be fed via at least one optical waveguide on the side of the bearing plate in a plane between the working area and the radiation-reflecting structure into the bearing plate. In this way, the light source can be moved locally to a location where better space conditions prevail. In specific cases however, it would also be conceivable to arrange the light source elsewhere, for example below the bearing plate. The light source may be for example commercially available light-emitting diodes or other luminaires.

Further advantages may be achieved if the bearing plate can be connected to an earthing line in order to avoid an electrostatic charging. For this purpose, the working area is provided with an electrically conductive coating or made conductive in some other way.

Figure 2:
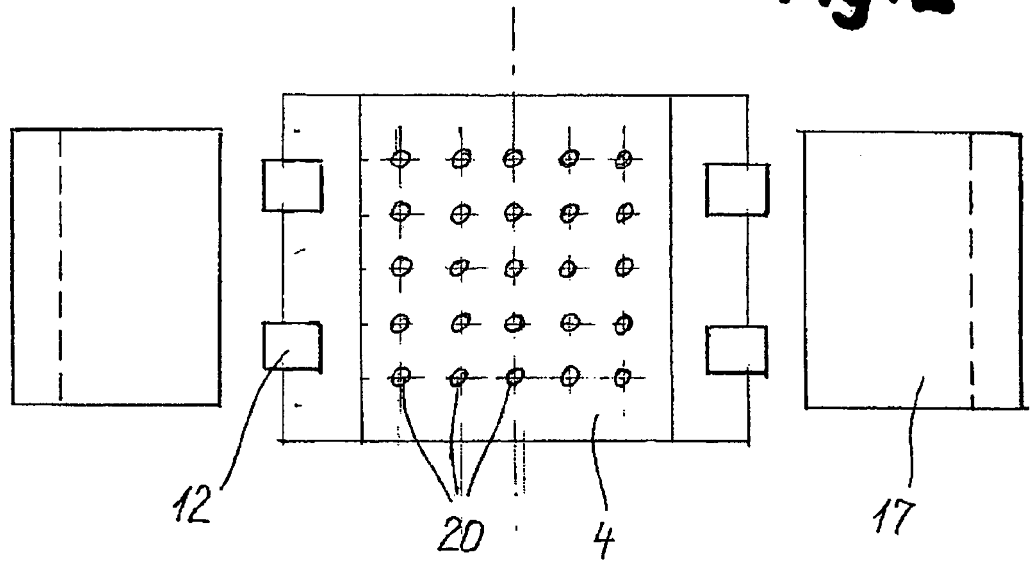
Figure 3:
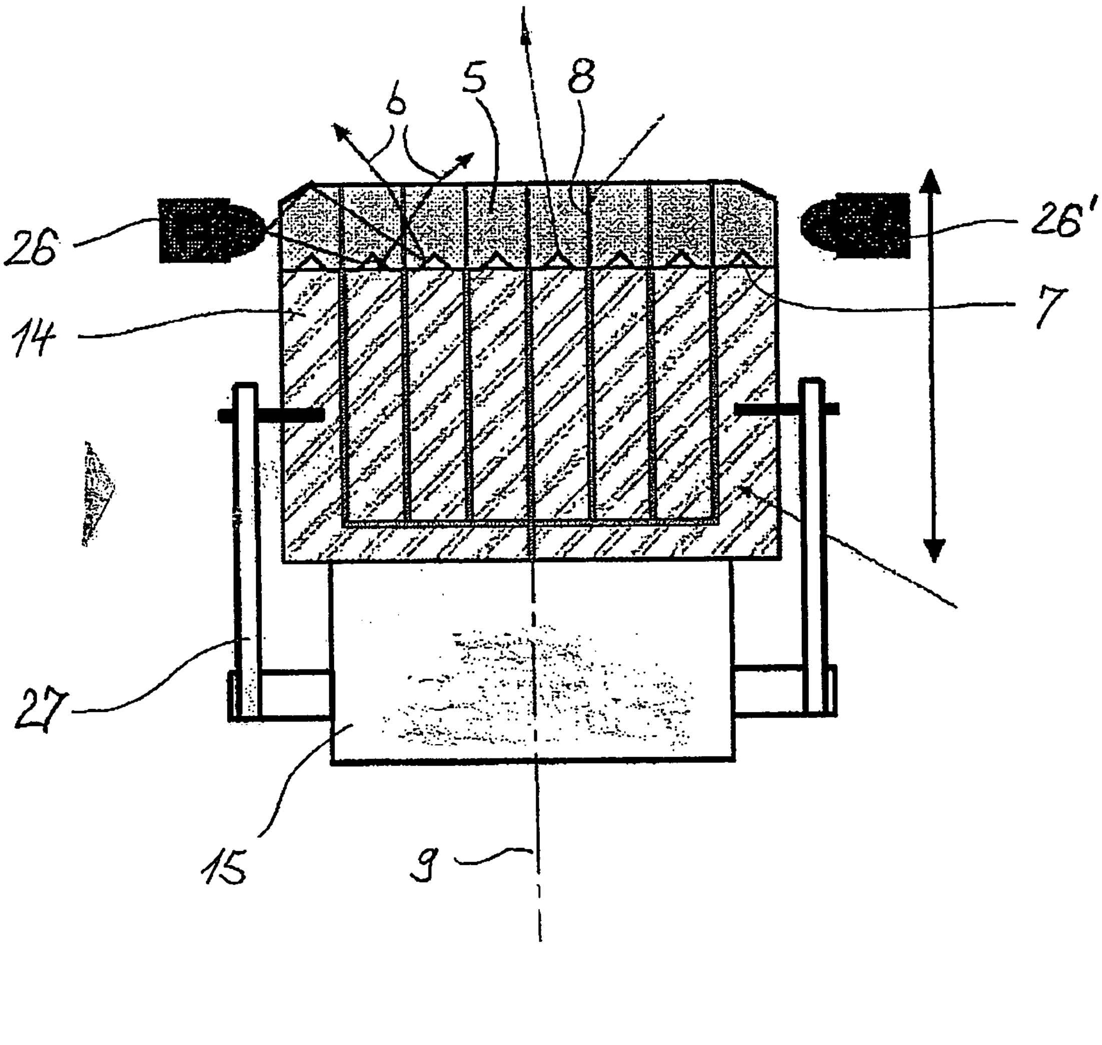

Further advantages and individual features of the invention emerge from the description below of an exemplary embodiment and from the drawings, in which:

FIG. 1 shows a partial cross-section through an apparatus according to the invention when used in a die bonder, FIG. 2 shows a plan view of the apparatus in accordance with FIG. 1 without a substrate, and FIG. 3 shows an alternative exemplary embodiment of an apparatus according to the invention.

As can be seen from FIGS. 1 and 2, an apparatus—designated overall by 1—essentially comprises a bearing plate 5, for example made of glass or made of some other transparent or partly transparent material. The bearing plate having an approximately rectangular plan has a working area 4, which may be provided for example with an electrically conductive coating 19. The bearing plate 5 is slightly bevelled on the two longitudinal sides. This bevelling facilitates the entry and exit of the substrate that is moved linearly in arrow direction a. A light-reflecting structure 7 in the form of a plurality of bowl-shaped depressions is arranged on the rear side 6 of the bearing plate 5. The bearing plate is additionally pervaded by a plurality of vacuum channels 8 which end at openings 20 in the working area 4.

The bearing plate 5 rests on a plate base 14 and is releasably connected thereto with the aid of clamps 12. These clamps made of metal also serve, moreover, for earthing the working area. The plate base comprises a thermally conductive material such as e.g. steel. A hole 25 is arranged in the centre, which hole opens into a distribution chamber 18 on the side of the bearing plate. In this case, the distribution chamber encompasses all the vacuum channels 8 in the bearing plate 5. Moreover, the distribution chamber 18 is arranged such that different bearing plates 5 with a varying arrangement of vacuum channels 8 can be emplaced.

The plate base 14, for its part, rests on a pedestal 15, which may comprise the same material as the plate base. The releasable connection between the pedestal 15 and the plate base 14 comprises a lateral locking arrangement 13, for example. The pedestal 15 also has a hole 25', a central alignment with the hole 25 in the plate base 14 being achieved with the aid of a centering sleeve 16. The hole 25' is connected to a vacuum line 9 leading to a vacuum source. A heating apparatus 11, for example in the form of a plurality of heating cartridges, is arranged in the pedestal 15. Said heating apparatus is connected to a current source via a current supply line 22. It goes without saying that a thermostat could also be provided, with the aid of which a specific working temperature can be complied with. An earthing line 21 ensures that the bearing plate cannot be charged electrostatically.

The illumination of the working area 4 by means of transmitted light is effected by means of a respective light source 10 on both sides of the bearing plate 5. The light from said light source is fed laterally into the bearing plate 5 via curved optical waveguides 17. In this case, the light is reflected at the structure 7 and directed uniformly upwards towards the working area 4. It goes without saying that the intensity of the light source and/or the wavelength of the light may likewise be controllable.

In the exemplary embodiment, a substrate 2 in the form of a strip which can be moved cyclically in arrow direction a is led over the working area 4. By means of a picker (not illustrated more specifically here) with a picking arm 23, a chip is positioned precisely above the substrate 2, placed onto the substrate and adhesively bonded to the substrate. An image recognition system in the form of a camera 24 serves for positioning, said camera being able to recognize positioning marks on the rear side of the substrate 2. It is evident that in this case the substrate 2 is fixed immovably on the working area 4 by means of the vacuum present on the vacuum channels 8, while heat is fed to the working area by means of the heating apparatus 11 and promotes the adhesive-bonding process.

In the case of the apparatus in accordance with FIG. 3, the bearing plate 5 made, for example, of glass ceramic is fixedly adhesively bonded to the plate base 14. The light is fed in laterally not with the aid of optical waveguides, but rather by means of light sources 26, 26' which directly radiate in laterally. The radiation-reflecting structure 7 comprises pyramidal or conical depressions. The course of the radiation is indicated by the radiation arrows b. As is evident from this, light may in this case also be reflected by total internal reflection at the working area 4 and be reflected back onto the structure 7.

In this exemplary embodiment, the pedestal 15 is likewise connected to the plate base 14 by means of releasable clamps 27. A heating apparatus (not illustrated more specifically here) is incorporated in the pedestal 15.

The individual vacuum channels 8 in the bearing plate 5 do not open into a common distribution chamber, rather they are continued directly in the plate base 14 and then open into a common vacuum line 9.

The invention claimed is:

1. An apparatus for supporting a semiconductor substrate during processing of the semiconductor substrate, the apparatus comprising:

a support structure having an upper side and a lower side, the support structure being at least partially transparent, the upper side defining a working surface including a working area for supporting a semiconductor substrate during processing of the semiconductor substrate, the working surface defining vacuum openings configured to be connected to a vacuum source to retain the semiconductor substrate against the upper side during processing, the support structure including a plurality of non-planar light reflecting structures adjacent the lower side; and at least one light source emitting light into the support structure from a lateral side of the support structure, the lateral side being disposed between the upper side and the lower side, the emitted light interacting with the non-planar light reflecting structures to homogeneously illuminate the working area.

2. A die bonding apparatus for supporting a substrate during bonding of a chip to substrate, the apparatus comprising:

a support structure having an upper side and a lower side, the support structure being at least partially transparent, the upper side defining a working surface for supporting a substrate during a die bonding operation whereby a semiconductor chip is bonded to the substrate, the working surface defining vacuum openings configured to be connected to a vacuum source to retain the substrate against the upper side during processing, the support structure including a plurality of non-planar light reflecting structures adjacent the lower side; and at least one light source emitting light into the support structure from a lateral side of the support structure, the lateral side being disposed between the upper side and the lower side, the emitted light interacting with the non-planar light reflecting structures to illuminate the working surface.

3. The apparatus of claim 1 further comprising a heating apparatus configured to heat the working surface.

4. The apparatus of claim 1 wherein the support structure is comprised of glass ceramic.

5. The apparatus of claim 1 wherein the plurality of non-planar light reflecting structures are at least one of pyramidal-shaped, conical-shaped, bowl-shaped, or strip-like shaped.

6. The apparatus of claim 1 wherein the support structure is a bearing plate, and the plurality of non-planar light reflecting structures are at least partially defined by a plurality of recesses extending into the lower side of the bearing plate.

7. The apparatus of claim 1 wherein the support structure includes a bearing plate disposed above a plate base, and the plurality of non-planar light reflecting structures being included in the plate base.

8. The apparatus of claim 1 wherein the support structure includes a bearing plate disposed over a plate base, and the plurality of non-planar light reflecting structures are at least partially defined by a plurality of recesses extending into the lower side of the bearing plate.

9. The apparatus of claim 1 wherein the support structure includes a bearing plate releasably connected to an underlying plate base.

10. The apparatus of claim 1 wherein the support structure includes a bearing plate adhesively bonded to an underlying plate base.

11. The apparatus of claim 1 wherein the support structure includes a bearing plate, a plate base supporting the bearing plate, and a pedestal supporting the plate base.

12. The apparatus of claim 11 further comprising a heating apparatus within the pedestal configured to heat the working surface.

13. The apparatus of claim 1 further comprising a heatable coating on at least a portion of the support structure.

14. The apparatus of claim 1 further comprising at least one corresponding optical waveguide configured to feed the emitted light from the at least one light source into the lateral side of the support structure.

15. The apparatus of claim 1 wherein the working surface is electrically conductive and further comprising an earthing line affixed to the working surface.

16. The apparatus of claim 1 wherein the plurality of non-planar light reflecting structures are distributed substantially uniformly about the lower side of the support structure.

17. The apparatus of claim 1 wherein the plurality of non-planar light reflecting structures are not distributed uniformly about the lower side of the support structure.

18. The apparatus of claim 1 further comprising a distribution chamber within the support structure configured to communicate between the plurality of vacuum openings and the vacuum source.

19. The apparatus of claim 1 wherein the substrate is sized to cover essentially all of the working surface.

20. The apparatus of claim 1 wherein the substrate includes a leadframe configured to receive a plurality of silicon chips.

21. The apparatus of claim 1 wherein the substrate includes a strip structure configured to receive a plurality of silicon chips.

22. The apparatus of claim 1 wherein the substrate includes at least one silicon chip.

23. The apparatus of claim 1 wherein the emitted light interacts with the non-planar light reflecting structures to homogeneously illuminate the working area.

* * * * *